United States Patent [19]
Bailey

[11] 3,965,363
[45] June 22, 1976

[54] FUELESS POWER MEANS AND METHODS
[76] Inventor: Wayne Bailey, Box 89, Johnsonville, N.Y. 12094
[22] Filed: Apr. 18, 1974
[21] Appl. No.: 462,189

[52] U.S. Cl. .............................................. 290/1 R
[51] Int. Cl.² ........................................ H02P 9/04
[58] Field of Search ....................................... 290/1

[56] References Cited
UNITED STATES PATENTS
2,461,449   2/1949   Smith ..................................... 290/1

Primary Examiner—Robert K. Schaefer
Assistant Examiner—John W. Redman

[57] ABSTRACT

Taking advantage of numerous sources of fueless energy such as the heats of volcanoes, hot springs, active and inactive oil and natural gas wells, geothermal heats and other natural steam power, some of these energy sources intermittent, and others continuous, are here combined to provide a steady flow of continuous fueless power for stationary or movable power plant use. It saves fossil fuels for uses far more important than their combustion, and does not pollute our human environment.

4 Claims, 1 Drawing Figure

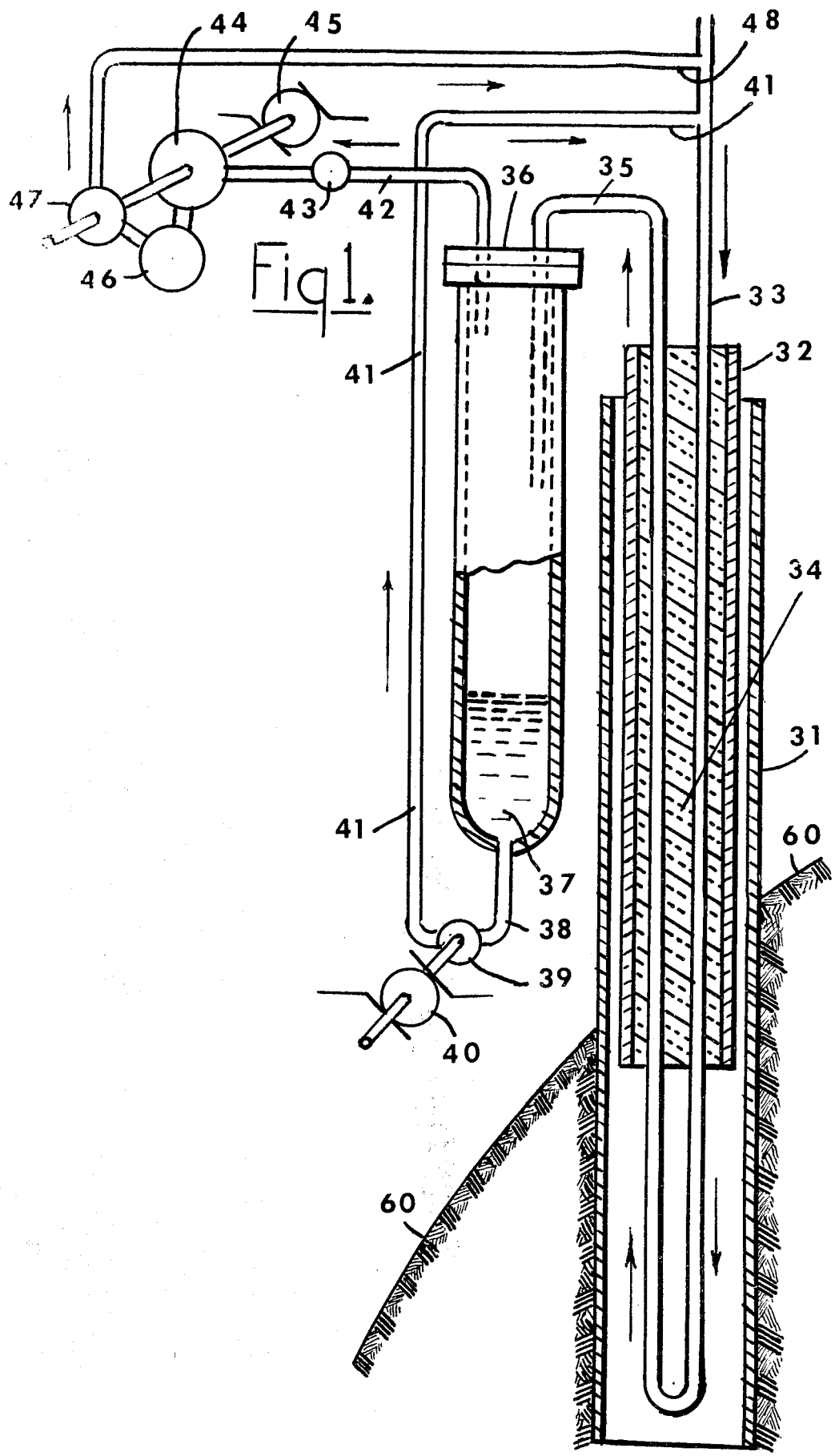

FUELESS POWER MEANS AND METHODS

Today's energy needs are so enormous that the coal, oil and natural gas to daily satisfy them is begining to indicate the ultimate end of these highly important natural resources. Since they are now used in many industries to produce other items besides heat and power, it is now clearly incumbant on inventors and power engineers to substitute fueless heat and power wherever this is possible and practical.

Mere politics or diplomacy will never bring world wide peace into being. This will only be brought about by inventions in (1) communication, (2) cheaper transport (especially through the air), (3) cheaper and far more abundant non-poluting fuel and fueless power, and (4) far greater improvements in the food raising and transport process.

While electrical and mechanical means and methods of communication have reached a high degree of technical perfection, numerdifferences in life style, idiologies, politics, languages traditions, and religions kindle all sorts of wars that refuse to discontinue.

Only when these differences are settled, and everyone on earth can be sure of the next day's food, clothes, and shelter, (and the rest of the almost thirty human essentials) can world peace be expected among all those who inhabit this revolving globe (the Earth) out here in space, as it orbits each year about the sun.

To bring about cheaper and better world wide transport, fuel, and power and food, pure water for us all to drink and much better air for us all to breathe, there is nothing so necessary and more important as fueless heat and power and fuels that are non posionous, far cheaper, and substantially limitless for mankind's ever expanding fuel requirements.

So one of the most important objects of this present invention is to forward the cause of world peace by the development of fueless power to help in the production and distribution of much cheaper and more abundant practically limitless non-polluting fuels. In the drawings...

FIG. 1 shows diagramatically my invention for obtaining power from Earth's internal heats, such as active or inactive oil or natural gas wells, hot springs, volcanoes, sources of geothermal steam and other geothermal heat sources.

In FIG. 1 I show means and method of removing underground heats for vapor power plant use. I use a U tube the liquid supply side designated at 33 and the internal fluid outgoing side of the U tube indicated as numeral 35. In tapping the underground heat of a volcanic mountain (or hill) 60 I drive a tube 31 into the side of 60 in which may repose another tube 32. The purpose of tube 32 is to hold heat insulating material but packed around that portion of the U tube nearest the outlet to tube numeral 31. That portion of the U protruding beyond (or below) tube 32 not being heat insulated but exposed to receive the heat coming in to it from the hot earth surrounding tube 31 at that point.

A fluid, presumably a liquid, is supplied the U tube in an outer area before the U tube enters the entrance of tube 32. As the fluid passes inward toward the bend in the U tube it picks up underground heat and continues to pick up underground heat after it has passed the bend in the U tube. Then the liquid or liquid and vapor mixture in the U tube enters that portion of the U tube insulated with heat insulating material 34 (in tube 32). When the liquid vapor mixture comes up and around the bend (the outlet side bend) of tube portion here designated by numeral 35 the vapor-liquid mixture in the U tube then enters the vaporliquid separation chamber shown as number 36 on the drawings.

In cylindrical vessel (or vapor-liquid separating chamber) 36 the liquid in the mixture settles to the bottom of chamber 36 forming pool 37. The separated vapor passes out of 36 through tube 42 and through throttle valve 43 controlling vapor engine (or motor) 44. The condensate from motor 44 settles in condensate tank 46 out of which it is pumped by condensate pump shown as numeral 47. From the condensate pump the condensate is returned to U tube 33 through pipe (condensate pipe) 48. An electrical generator 45 is driven by vapor engine (or motor) 44. From here electric power may be taken to wherever it is needed.

The hot liquid 37 that has settled (or separated) out from the vapor-liquid mixture issuing into separation chamber 36 through tube 35 (of the U tube) is pumped by return circulation pump 39 from drain tube 38 into return tube 41, tube 41 later returning the separated hot liquid to the supply portion 33 of the U tube. Forced recirculation return pump 39 is driven by electric motor 40, possibly receiving its electricity from electric generator 45 driven by vapor engine 44.

The power plant as shown in FIG. 1 is suitable for obtaining power from hot springs, geothermal areas where steam is issuing from the ground, from active oil and natural gas wells where the oil carries this picked-up ground heat upward in the side of the U tube designated as numeral 35. The chamber 36 surrounding both sides of the U is where the heat insulation 34 is packed (as shown in the drawing).

The liquid coming down 33 changes to a liquid-vapor mixture by the time it gets up to the top of pipe 32 in the hot side 35 of the U tube. This liquid-vapor mixture is delivered to a vapor - liquid separation device or chamber 36. There the liquid leaves the vapor-liquid mixture and decends to the bottom of the chamber 36 this liquid being shown as numeral 37. The vapor on the other hand leaves chamber 36 and going through pipe 42 and through valve 43 (throttle valve) actuates vapor engine 44 driving electrical generator 45. The condensate from vapor motor 44 is collected in condensate tank 46 and is removed from 46 by a condensate pump 47. From this point it continues on through pipe 48 to re-enter fluid incoming side of the U tube numeral 33 on the drawings.

In somewhat the same fashion the separated liquid 37 leaves separator 36 through pipe 38 and by means of sump pump 39 is delivered by pipe 41 back into the 33 side of the earth heat pick-up U tube, sump pump being driven by electric motor 40.

Whether the earth's heat is being picked up from the region of a volcano, in hot springs, or where geothermal heat is coming to the earth's surface as geothermal steam, or whether the heat of the deep earth is being picked up from worn out or active oil wells or gas wells, the same general apparatus combination serves to achieve the purpose of obtaining fueless power at the vapor engine 44. It is well established geologically that for each 60 feet downward the earth is penetrated, a 1° Fahrenheit temperature (roughly) can be expected. So that oil or natural gas coming to the surface of the earth, if it comes up from any substantial depth usually carries considerable heat to the surface. This normally wasted heat can be collected by my present U tube arrangement and make satisfactory waste heat power from any variety of working fluids (water, or Freon, or naptha, or gasoline etc). The main point is after the heat is collected by the U it has to be separated (the vapor from the liquid) before it goes to an engine for the production of vapor power.

It is also well within the province of my present invention to let the heat pick-up U tube be made up of several lengths of straight tube put together with suitable couplings, etc. If the U is very long this is necessary, although it has not been shown in the drawings hereto attached.

I claim:

1. In a fueless power plant, a heat pick up U tube, well beneath the ground level, said U tube encased in an outer protective tube driven in the ground, one tubular side of said U tube supplying heat pick-up fluid to said U tube, the other side of said U tube being connected to a vapor liquid separation device which is in turn connected to a vapor power producing means and having a second tube surrounding said U tube and encased by the outer protective tube, said second tube holding heat insulating material around the upper portion of said U tube, and including means for returning separated liquid to the fluid supply side of said U tube.

2. The invention described in claim 1, including said outer protective tube being a heating tube, surrounding said beneath the ground level U tube.

3. The invention described in claim 1, said outer protective tube driven in the ground being an oil or natural gas well casement.

4. The invention described in claim 1, said outer protective tube driven in the ground being in a volcano, or in a geothermal land area.

* * * * *